P. HANSON.
MANURE SPREADER.
APPLICATION FILED MAR. 28, 1910.
1,148,314.
Patented July 27, 1915.
3 SHEETS—SHEET 3.
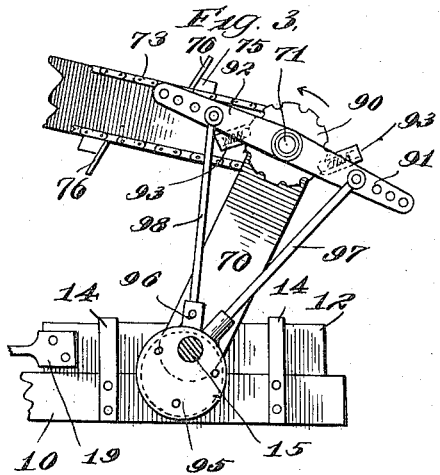
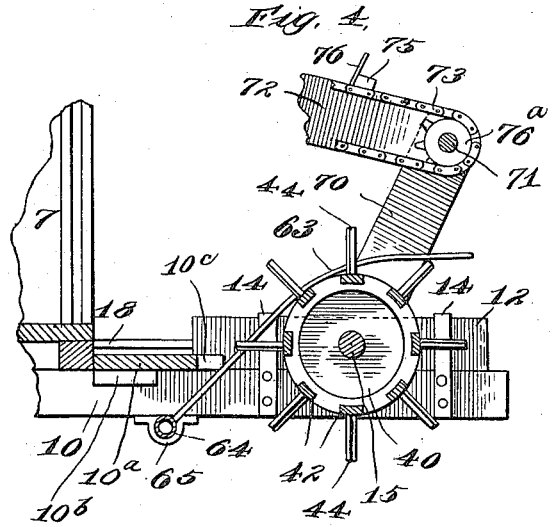
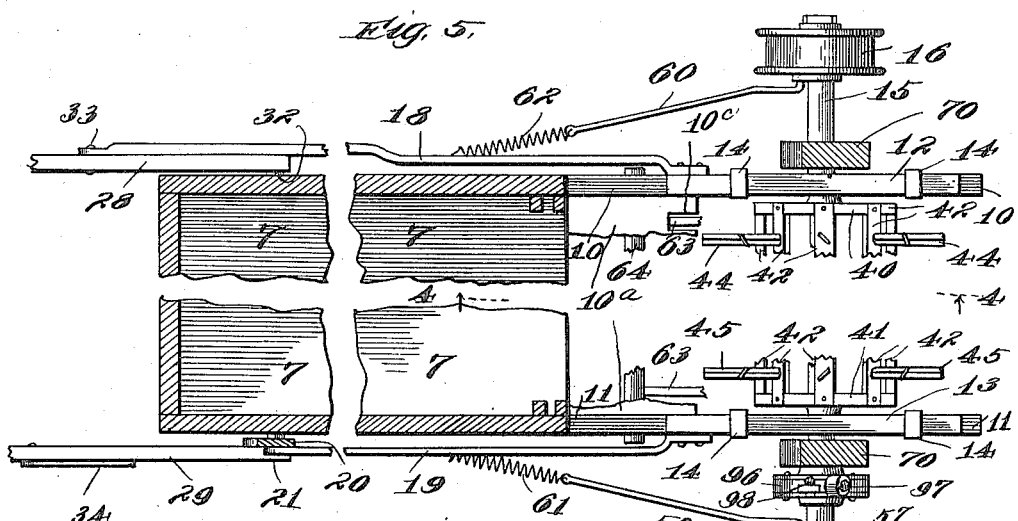
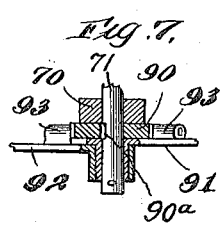
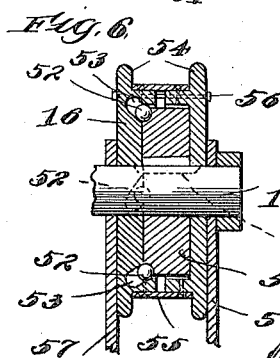

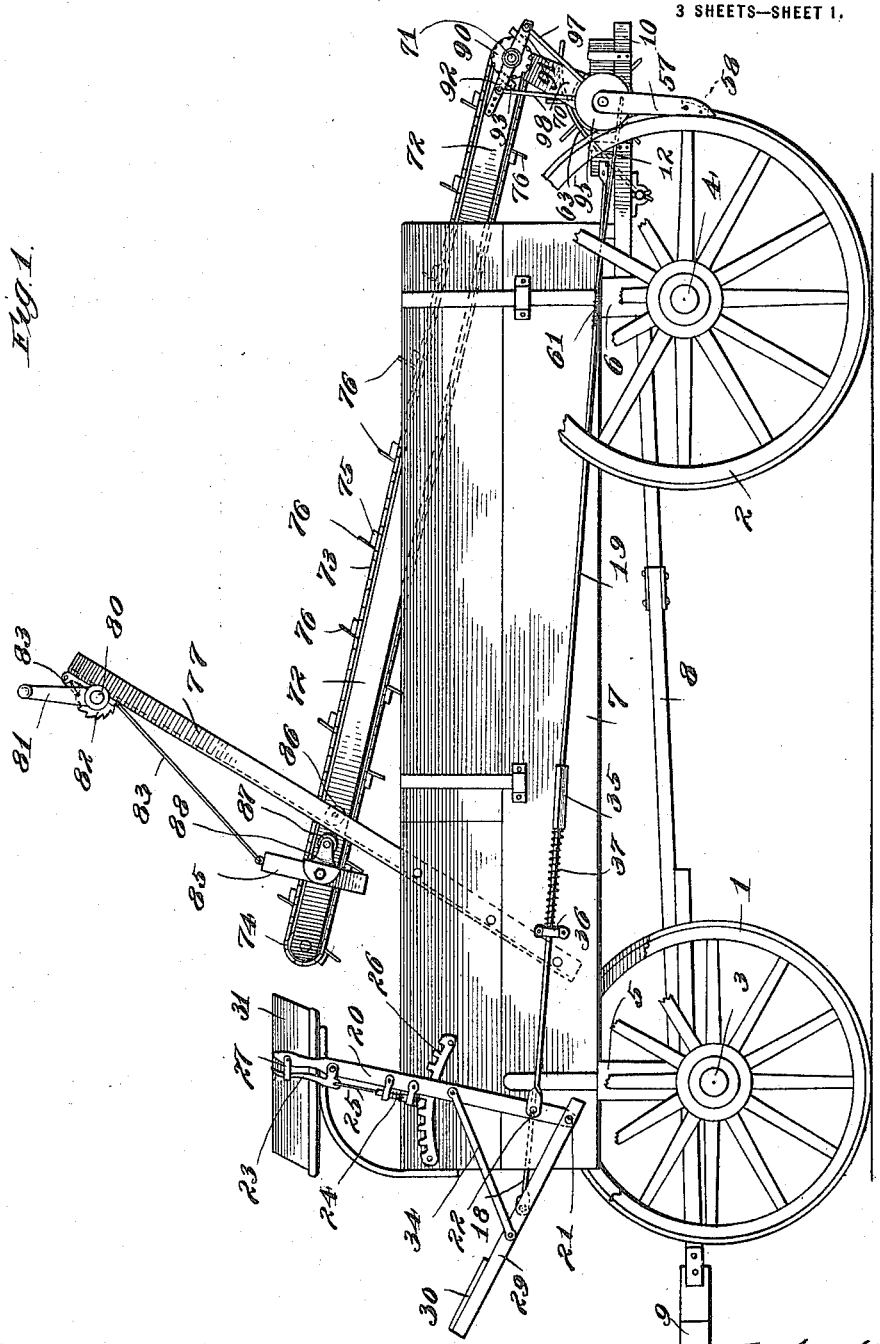

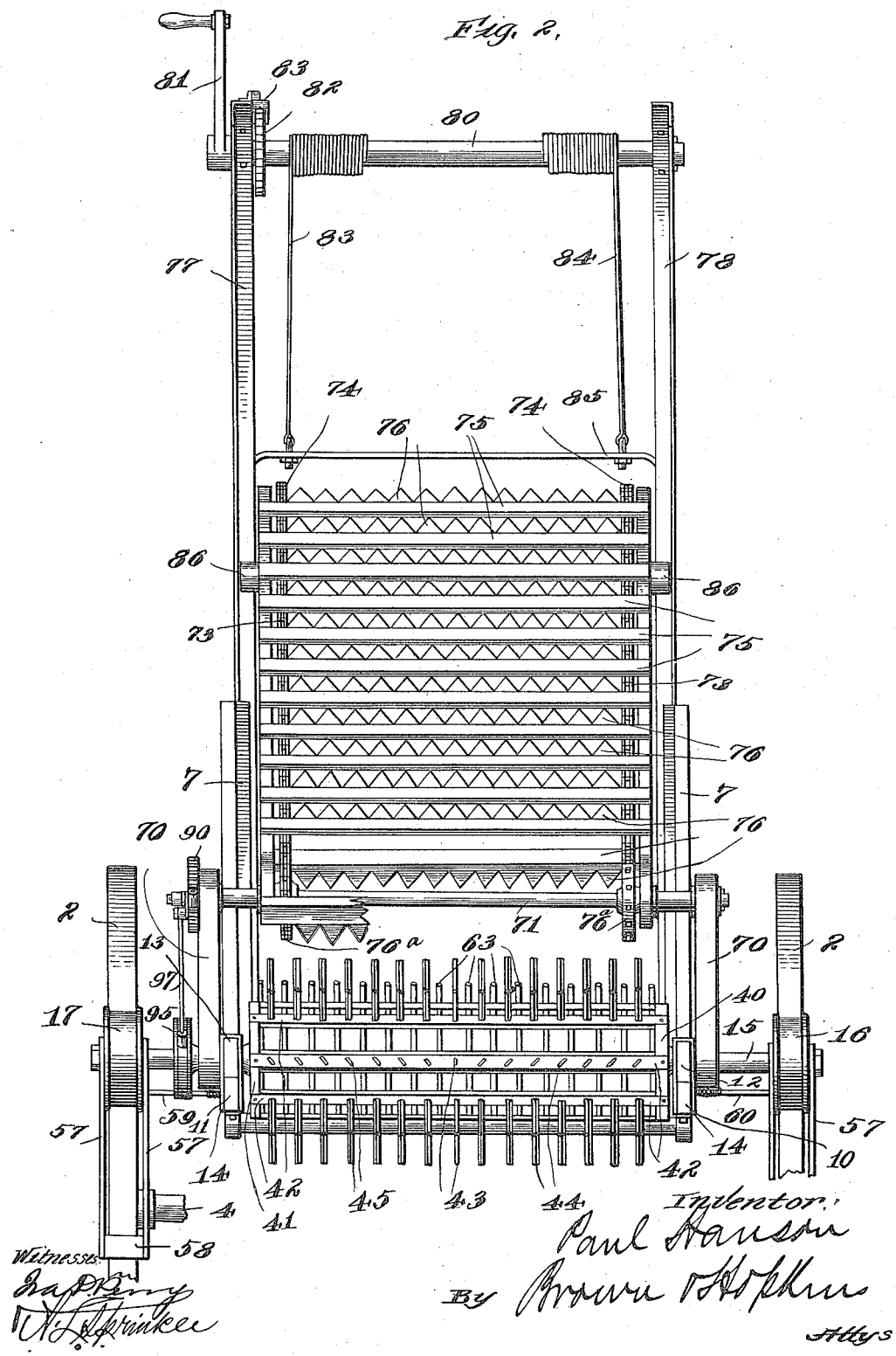

UNITED STATES PATENT OFFICE.

PAUL HANSON, OF WILD HORSE, COLORADO.

MANURE-SPREADER.

1,148,314.

Specification of Letters Patent. Patented July 27, 1915.

Application filed March 28, 1910. Serial No. 551,833.

*To all whom it may concern:*

Be it known that I, PAUL HANSON, a citizen of the United States, residing at Wild Horse, in the county of Cheyenne and State of Colorado, have invented certain new and useful Improvements in Manure-Spreaders, of which the following is a full, clear, and exact specification.

The invention relates to improvements in manure spreaders adapted for the distribution of barnyard manures and other forms of field fertilizers.

The primary object of the invention is to provide an improved manure spreader adapted to feed from the top of the load instead of from the bottom, which has heretofore been the general practice in this class of devices. When the feed of the load to the distributing mechanism or beater is by means of moving some part at the bottom of the bed or box supporting the load of manure, it has been necessary to move the entire load toward the beater and such means of feeding the load has required a large expenditure of power.

In the present invention, the feeding mechanism is adjustably supported above the bed or box and is adapted to be raised to a sufficient height above the bed or box so that it will not interfere with the operation of loading. It is then adapted to be lowered to a position for feeding from the top of the load when it is desired to begin the operation of distributing the load.

A further object of the invention is to provide an improved manure spreading device that may be conveniently attached to an ordinary farm wagon, thus decreasing the expense of providing such a machine.

A further object of the invention is to provide in a manure spreader of the class described improved and simple means for driving the feeding and distributing mechanism.

A further object of the invention is to provide in a manure spreader of the class described simple and improved mechanism for driving the feed device.

A further object of the invention is to provide in a manure spreader of the class described simple and efficient mechanism consisting of an improved friction drive for imparting motion from the wheels of the wagon to the beater and to the feed mechanism.

A further object of the invention is to provide, in a manure spreader of the class described having a friction drive, improved means under the control of the operator for throwing the friction drive mechanism into and out of operative relation with the wheels of the wagon.

A further object of the invention is to provide, in a manure spreader of the class described having its beater and feed mechanism operated by a friction drive adapted to contact with and be driven by the peripheral portions of the wagon wheel, an improved form of scraper under the control of the operator for cleaning the peripheral portions of the wagon wheels to present such peripheral portions of the wheels in proper condition for operating the friction drive mechanism.

A further object of the invention is to provide, in a fertilizer distributer of the class described having friction pulleys adapted to be driven by contact with the peripheral portions of the wagon wheels, improved ball clutches adapted to render the friction pulleys operative to drive the distributer mechanism in one direction but inoperative in the opposite direction.

A further object of the invention is to provide in a manure spreader of the class described being provided with a beater shaft driven from the wheels of the vehicle, an improved and adjustable step-by-step clutch mechanism for operating the feed device from the beater shaft.

A still further object of the invention is to provide in a manure spreader of the class described having a rotatable beater, improved beater teeth arranged to spread the fertilizer beyond the ends of the beater, thus enabling the machine to distribute the fertilizer over a strip of land somewhat wider than the length of the beater and the usual width of the wagon box.

To the attainment of these ends and in order to accomplish certain other new and useful objects, which will later be set forth, the invention consists in the features of novelty hereinafter described, set out more specifically in the appended claims, and shown in the accompanying drawings forming a part of this specification, and in which drawings—

Figure 1 is a side view of my improved spreader mechanism shown attached to an ordinary farm wagon. Fig. 2 is a rear elevation of the mechanism with parts of the wagon to which it is attached broken away. Fig. 3 is a broken detail showing the mechanism for driving the feed mechanism from the beater shaft. Fig. 4 is a sectional view through the beater and the feed mechanism, the same being taken on line 4—4 of Fig. 5. Fig. 5 is a broken plan view of the beater showing the manner of attachment of the spreader mechanism to the wagon. Fig. 6 is a detail sectional view of one of the driving pulleys on the beater shaft, and Figs. 7 and 8 are details of the clutch mechanism for driving the endless feed belt.

I am aware that frequent attempts have been made to produce a satisfactory manure spreader heretofore by the attachment of spreader mechanism to an ordinary farm wagon but such machines have not usually been satisfactory because of the difficulty and inconvenience of attaching and removing such mechanisms; and further it has been found that such devices constructed as attachments have not been entirely satisfactory because of their want of durability and strength. For this reason it has become the common practice to construct manure spreaders by permanently building the spreader mechanism into the wagon so that the wagon so equipped is incapable of any use except for the purpose of spreading manure.

Early in this art it was purposed to attach a beater or distributer for fertilizer to ordinary farm wagons but one of the difficulties encountered was the labor required to feed the manure or other fertilizer to the beater or distributing mechanism. This condition led to the provision of various forms of feed mechanism heretofore usually constructed at the bottom of the wagon box, such as endless belt mechanism for feeding the load of manure or fertilizer toward the rear of the box where the beater or distributing mechanism is usually located. This common method of constructing the feeding mechanism in the bottom of the box at once produced a more or less complex construction which has caused the manure spreading mechanism to usually be built permanently into the wagon itself. The common method of constructing the feed mechanism in the bottom of the box necessitates the constant movement or shifting of the entire load and entails the expenditure of a large amount of power and has made it necessary that all of the operative parts of the spreader mechanism should be very large and strong and consequently very expensive, besides consuming a very large amount of power to draw such a machine over the fields, particularly when in operation spreading the load.

One of the chief aims of the present invention therefore is to so construct a manure spreader that the manure may be properly fed to the distributing mechanism with the least possible expenditure of power and this is accomplished by providing feed mechanism in the form of an endless belt conveyer adjustably suspended over the top of the wagon box and adapted to be lowered by the operator onto the top of the load to feed first from the top and to be gradually lowered until the box is emptied.

While the spreader mechanism herein shown, described and claimed is capable of being furnished as an attachment to an ordinary farm wagon, if desired, it is not essentially to be regarded as an attachment but may be embodied in a complete spreader including the vehicle as in the ordinary construction of manure spreader.

The wheels of the vehicle containing the preferred embodiment of the invention are indicated by the reference characters 1 and 2 in Fig. 1, 3 being the front axle and 4 the rear axle. The usual front and rear bolsters 5 and 6 are shown supporting a wagon box 7 of ordinary construction, while the reference character 8 indicates the usual reach or connections between the front and rear axles, and 9 is the tongue.

In attaching the improved spreader mechanism to the wagon box the rear end gate of the box is removed, as shown more particularly in the plan view of Fig. 5. To the under side of the wagon box, at the rear end, is secured by bolting or other convenient means the two sills 10, 11, of dimensions suitable to properly support the beater and conveyer mechanism. These sills 10, 11 project rearwardly from the rear end of the wagon box, as shown more clearly in Figs. 1, 4 and 5. Slidably mounted on the top of members 10 and 11 are members 12 and 13, which are held in position thereon, each by two U-shaped strips 14, which have their extremities secured to members 10, 11. The beater shaft 15 is journaled in and carried by these slidably mounted members 12, 13, and the beater shaft, which carries at its extremities the grooved friction wheels 16, 17, for engaging the peripheries of the rear wheels of the wagon to operate the beater shaft and the feed mechanism, may be caused to engage or disengage the peripheries of the rear wagon wheels by sliding the supporting members 12, 13, through the controlling rods or arms 18, 19, secured thereto and being pivotally attached at their forward extremities to the operating mechanism adjacent the front end of the wagon box which is convenient to the driver's seat, and under the control of the driver. This operating means may be either under the control of the hand or the foot of the operator, or both, which is the preferred form, as illustrated. In this embodiment 20 is the hand lever pivotally secured to the wagon box at 21, and having the beater controlling rod 19 pivoted to it at 22. This lever is provided with a suitable hand latch 23 pivoted near its upper extremity and designed to operate the spring controlled pawl 24 through rod 25. The pawl 24 is adapted normally to engage the teeth on rack 26 secured to the wagon box, but when it is desired that the operator control the beater by his foot the latch 23 and pawl 24 may be withdrawn or rendered inoperative by means of the latch 27 which is pivoted at the upper extremity of the hand lever 20 and is designed to engage over the end of the latch 23. In order that the beater may be also under the control of the feet of the driver and in order that the controlling member 18 on the opposite side of the wagon box may be under the driver's control, the members 28, 29 are pivotally secured to the wagon box, the member 29 being pivoted preferably at the same point 21 as the hand lever 20. The members 28, 29, are connected by the foot board 30 which is within convenient reach of the operator from his seat 31. The member 28 is pivoted on the opposite side of the wagon box, preferably on the same axial line as member 29 and hand lever 20, as indicated by the reference character 32 in Fig. 5.

In order that the hand lever 20 may operate not only the beater operating member 19 but the member 18 as well, the member 18 is pivoted at its forward extremity as indicated at 33 to the pivoted member 28 and the foot operating means is connected to move with the hand lever 20 by the connecting strap 34 which is secured at one end to the foot lever 29 and at its other extremity to the hand lever 20. It is designed that the beater shaft shall be held normally out of engagement with the peripheries of the rear wagon wheels so that the grooved friction wheels shall only engage the wheels to rotate the beater shaft when caused to positively engage the wheels by the operator. In order that the beater shaft may be normally out of engagement both the members 18, 19, which operate the beater shaft and the frame supporting the same are spring controlled, as shown in Fig. 1, in which the member 19 has secured to it a suitable shoulder 35. Between this shoulder 35 and some fixed portion on the wagon box, as for example, the supporting bracket 36, is interposed the compression spring 37. The member 18 controlling the beater shaft on the opposite side of the wagon box is to be provided with the same spring control but the same being on the reverse side of the wagon box does not appear in the drawings, since this part is shown broken out of the view in Fig. 5. From the above description of the beater control, it will be apparent that the springs 37 will normally retract the beater shaft so that the friction wheels 16, 17, will not engage the rear wagon wheels unless the operator by means of either the hand or foot operating mechanism positively throws the device into operation. It will also be apparent that the mechanism may be locked in operative position with the friction wheels 16, 17, on the beater shaft in engagement with the peripheries of the rear wagon wheels by means of the hand latch 23 which the driver may release by operating the latch 27 and so cause the spring-pressed pawl 24 to engage the teeth on the rack 26. If, however, the operator does not desire to positively lock the beater shaft into engagement with the rear wheels of the wagon, the pawl 24 may be rendered inoperative, which is accomplished by locking latch 23 with the pivoted latch 27, as illustrated in Fig. 1. When the hand lever 20 is thus enabled to float over the rack bar 26, it will be apparent that the driver may control the mechanism either through the hand lever 20 or the foot board 30.

The details of the beater will now be described. While any desired and common form of beater may be employed, the preferred form is that shown in the drawings consisting of a plurality of beater heads or spiders 40, 41, fixed to rotate with beater shaft 15 and carrying on their peripheral portions a plurality of cross bars 42. On cross bars 42 are mounted a plurality of teeth which may be of the usual form, although it is preferred that these teeth be rectangular in cross section, being in width several times their thickness. The preferred arrangement of the teeth on the cross bars 42 is shown more clearly in the elevation view in Fig. 2 and to an extent in Fig. 5, from an inspection of which views it will be seen that one tooth in each of the cross bars 42 at the middle is set in the usual manner so that the plane of the tooth will coincide with the plane of rotation of the beater, as indicated by the teeth 43. The teeth on both right and left of the center of the cross bars are arranged in the manner shown in Figs. 2 and 5 at an angle to their planes of rotation when the beater is caused to rotate on its axis, or, in other words, all of the teeth on the right of the center of the beater strips are arranged so that their planes converge inwardly as the beater rotates in its operative direction while all of the teeth on the left of the center of each of the beater bars are arranged at an angle so that their planes also converge toward the center during the forward rotation of the beater. These teeth on both right and left of the center of the beater bars are arranged at an angle of approximately 45° to the plane of their rotation or to the longitudinal axis of the beater strips. The teeth on the right half of the beater strips are indicated by the reference character 44 while those on the left hand portion are indicated by the reference character 45, and it will be seen that the planes of the teeth 44 and 45 are approximately at right angles to each other. This arrangement of the teeth is found to be very beneficial, as it is found that when the material is thrown from the beater wheel it is being rapidly revolved, the material being scattered by the beater being spread somewhat so that it will be made to cover a strip wider than the total length of the beater, which is usually approximately the width of the wagon box.

The construction of the friction wheels 16, 17, will now be described. In Fig. 6 is shown in detail a section taken through friction wheel 16 and from an inspection of the same it will be seen that the same consists of an inner wheel 50 fixed to shaft 15 by key 51 or other suitable means. This wheel 50 is provided with a plurality of notches in its peripheral surface adapted to take the balls 52, as indicated in Fig. 6. This construction is what may be termed a ball-clutch and the recesses in the periphery of the wheel 50 are so arranged in connection with ball races in the divided portions of the wheel 16, as indicated at 53, so that the friction wheel 16 may be rotated in one direction and be free to revolve on shaft 15 and over the inner wheel 50, the balls 52 being crowded to the outermost portions of the recesses 53. When, however, the friction wheels 16 are caused to rotate in the opposite direction, the balls 52 will by reason of gravity descend to the bottom of the slot 53 and be caught between the walls of the slot 53 and the walls of the depressions in the wheel 50 so that the parts will be securely locked together and the turning of the friction wheel 16 will cause the inner wheel 50 and the shaft 15 to be revolved. In order that the friction wheel 16 may be caused to rotate without fail by the tire of the wagon wheel its peripheral surface is provided with flanges, as indicated at 54, and the grooved periphery of the wheel between the flanges 54 is covered with a frictional band of fiber, leather, or some suitable composition, as indicated by the reference character 55. The portions of the friction wheel 16 are secured together around the inner wheel 50 and the frictional band lock between the flanges 54 by means of suitable bolts screw-threaded and provided with nuts, if desired, as indicated by the reference character 56. It will be seen that this construction will permit the friction wheel 16 to be easily taken apart for the purpose of renewing the steel clutch balls 52 or for the purpose of applying a new band 55 of frictional material.

In order that the frictional wheel 16 for driving the beater shaft and the feed mechanism may be operated properly from the tires of the wagon wheel by frictional contact therewith, it is desirable that the tires be kept clean and for this purpose it is necessary to provide a scraper. The form of scraper preferred is that illustrated in the drawings and shown in Figs. 1, 2, 5 and 6. It consists of strips 57 journaled for convenience of support on beater shaft 15 on opposite sides of and adjacent wheels 16 and 17. These strips 57 may be of continuous U-shaped construction and provided with a scraper portion 58 at their lower extremity for engaging the tire of the wagon wheel and cleaning any mud or dirt therefrom before the tire engages the friction wheels 16, 17. The part 58 of the scraper is preferably removable so that when the scraper member becomes worn it may be renewed.

The scrapers 57 may be operated to cause them to engage and be disengaged from the peripheries of the driving wheels by any convenient means but the preferred means is that illustrated in Figs. 1 and 5, which consists in connecting the scrapers with the beater shifting members 18, 19, through the medium of suitable rods 59 and 60. It is preferred that the connections between the rods 59 and 60, and members 18 and 19 be elastic, which may be accomplished by interposing springs 61 and 62, as indicated in Figs. 1 and 5.

In order that the fertilizers to be distributed by the beater may be properly presented to the beater and prevented from falling from the box before being engaged by the teeth of the beater I provide a suitable frame comprising a plurality of guide rods 63 which extend backwardly between the various rows of teeth on the beater and are secured at their forward ends to a suitable shaft 64 which is loosely journaled at its extremities in bearings 65 on the under side of the supports 10, 11.

The construction of the beater and its driving mechanism having been described, I will now describe the feed mechanism by which the load of fertilizer is brought to the beater for distribution.

As before stated, it has heretofore been the common practice to mount a suitable apron under the load usually in the bottom of the wagon box but my improved feed mechanism consists of an endless carrier adjustable for operation throughout the limits of the wagon box and adapted to constantly engage the load of fertilizer from the upper side thereof. Since the carrier or feed mechanism should maintain a constant relation with the beater mechanism I preferably attach the same to the beater shaft 15 by means of suitable pivoted supports 70, there being one adjacent each end of the beater journaled on shaft 15 and carrying in suitable bearings at their upper extremities the feed carrier driving shaft 71. From shaft 71 a suitable pivoted carrier frame 72 extends forwardly to near the front end of the wagon box. This frame 72 may be of angle iron or any other suitable construction adapted to furnish a suitable support for the endless belt 73 carried thereby.

At the forward extremity of the feed carrier frame 72, is journaled suitable sprocket wheels not herein shown in detail, over which the endless carrier 73 is adapted to pass. This carrier belt 73 may be of any desired form of endless carrier construction but the preferred form is that herein shown which consists of a plurality of sprocket chains 74 connected by suitable cleats or strips 75 and passing over suitable driving sprockets 76ª journaled on the carrier driving shaft 71.

In order that the carrier 73 may properly engage the fertilizer material for the purpose of conveying it to the beater, the cleats or strips 75 on the feed carrier 73 are provided along their forward edges with strips of sheet metal, as indicated at 76, the same being provided with a plurality of angular teeth, as shown more clearly in Fig. 1. In order that the teeth on feed strips 76 may be presented in the proper relation to the fertilizer material to engage it and drag it to the beater and then release it, it is preferred that the forward edges of the cleats 75 to which the toothed strips 76 are secured should be beveled so as to give the teeth on strips 76 a slight backward inclination, thus causing the teeth to more readily release the fertilizer, which is very important in preventing the winding of such materials as straw, corn stalks and the like when contained in the fertilizer to be distributed.

In a feed device of the character described, which engages the manure from the top of the load it is very desirable that the same be adjustable throughout the limits of the wagon box and at the same time be under perfect control of the driver.

To support the carrier I secure to the sides of the wagon box preferably on the interior thereof and in the manner indicated most clearly in Figs. 1 and 2, the two side bars 77 and 78. These side bars are preferably of angle iron, as illustrated, and extend backwardly at about the angle indicated in Fig. 1, and serve both as a guide and a support for the feed carrier 72 throughout the limits of its movements.

At the upper extremities of the angular side bars 77, 78, is journaled a suitable shaft 80 provided with crank 81 and a toothed ratchet wheel 82 controlled by a suitable gravity pawl 83, which is mounted on the upper extremity of one of the supports 77, 78, adjacent the ratchet 82. The shaft 80 with its controlling mechanism serves as a windlass for operating the feed carrier 72 and the connection between the two is obtained by winding suitable cords or ropes around shaft 80, as indicated at 83, 84, and connecting the same at their lower extremities to the feed carrier frame 72, which is preferably accomplished by securing to said frame 72 the bail 85. In order that the feed carrier frame may operate properly on the angular supports 77, 78, it is preferred that anti-friction wheels be provided, as those shown at 86 on the inner angles of supports 77 and 78 and those shown at 87 on the exterior of the angles, the same being supported by suitable brackets 88 secured, if desired, as shown by the same bolts which secure the bail 85 to the feed carrier frame.

The mechanism for driving the feed carrier device will now be described. To the feed carrier driving shaft 71 is secured ratchet wheel 90 by spline 90ª provided with a plurality of peripheral indentations adapted to serve as a part of the ball clutch. Also, on shaft 71 adjacent the ratchet wheel 90 are journaled the two levers 91, 92, to which are secured barrels or boxes 93, as shown more in detail in Figs. 7 and 8. On the interior of these barrels or boxes 93 are contained suitable compression springs 94 adapted to constantly hold steel balls 95 in engagement with the periphery of ratchet wheel 90. The purpose of the balls 95 contained in the barrels or boxes on pivoted members 91, 92, is to act as ratchets in engaging the depressions in the periphery of wheel 90 and it will be noted that they are set to operate in opposite directions. Secured to rotate with beater shaft 15 is an eccentric 95 and around this eccentric and adapted to be operated by it is a strap 96 to which is secured the pitmen 97 and 98, which are pivotally connected at their upper extremities to the pivoted levers 92 and 91 respectively. The operation of this feed mechanism is as follows: It is desired, of course, to rotate the ratchet 90 only in the direction indicated by the arrow in Fig. 3 in order that the endless belt may feed the manure to the beater. The lever 91 has its ratchet barrel 93 set at such an angle that the spring pressed ball 95 will only be engaged between the wall of the barrel and the periphery of the ratchet wheel to operate the ratchet wheel 90 when the lever 91 is moved by the pitman 97 in the upward direction, and on the downward movement of the lever 91 and pitman 97 the ball will be crowded into the barrel 93 against the action of the spring 94, which will disengage the lever 91 from the wheel 90. On the other hand it will be seen that lever 92 with its corresponding barrel and ratchet mechanism will only cause the ball 95 to be impinged between the wall of the barrel and the periphery of the wheel 90 to rotate the wheel 90 in its downward direction. Therefore when the beater shaft 15 rotates the eccentric 95 to move both pitmen 97 and 98, in the upward direction, it will be seen that lever 95 will rotate the ratchet wheel 90 in the direction indicated by the arrow in Fig. 3, while pitman 98 will cause lever 92 to be rotated in the upward direction, which will cause the ball in the barrel 93 to be crowded into the barrel against the action of the spring 94 and so release the lever 92 and permit the ratchet wheel 90 to turn in relation to it. But on the corresponding downward movement of the eccentric 95, it will be seen that both pitmen 97 and 98 will rotate their levers 91, 92 in the downward direction, the lever 91 releasing during this Thus it will be seen that the ratchet mechathe ratchet wheel 90 to again rotate it in the direction indicated by the arrow in Fig. 3. Thus it will be seen that the ratchet mechanism herein provided will rotate the feed mechanism constantly in a given direction and with a certain and satisfactory degree of regularity of movement.

Having now described the construction of the various parts of the spreader, the manner of its operation will be described. As already observed, when the spreader is empty and in the absence of the hand operating lever 20 being locked in operative position, or the same or the foot operating member 30 being held in operative position, the entire spreader mechanism will be inoperative because the compression springs 37 through controlling rods 18 and 19 will force the beater supporting frame and the beater shaft and its frictional driving wheels rearwardly and away from the peripheries of the rear wagon wheels so that the entire mechanism will be out of gear. When it is desired to load the operator may by the use of the windlass operated through crank 81 raise the feed carrier mechanism as high as desired so that it will offer no interference to the filling of the wagon box with manure. When the load has been driven to the field where it is desired to spread the same, the pawl 83 may be disengaged from the ratchet 82 controlling the windlass so that the feed carrier frame 72 will rest upon the top of the load and in position to feed it back to the beater. If the operator then desires that the beater and the feed mechanism shall be put into operation to spread the load, this may be accomplished by operating the hand lever 20 or the associated foot lever which will operate the beater controlling members 18, 19, against the action of compression springs 37 and cause the frictional wheels 16, 17, on the beater shaft to engage the peripheries of their respective driving wheels.

It will be noted that the direction of rotation of the rear wheels of the wagon will give the beater shaft and the beater the desired direction of rotation without any gearing and it is found that the speed at which the beater should be driven will be about correct with the proportions of friction wheels and wagon wheels herein illustrated, although it will be apparent that the size of the friction wheels may be varied to suit different conditions.

When the feed carrier is in engagement with the top of the load and the beater shaft and the feed mechanism has been thrown into operation as described, the feed carrier frame will move by gravity down through the load as it is diminished from above until the entire load has been delivered to the beater and by it distributed in the usual manner. It will be noted that the rearward inclination given to the upwardly extending angle iron supports 77 and 78 for supporting the feed carrier frame causes the same to move conveniently out of reach of the driver's seat on the wagon box, but as it progresses downwardly it is caused to move forwardly so that at the end the entire load of manure is removed from the wagon box by the feed carrier and is delivered to the beater for distribution.

Many of the advantages of the improved spreader herein shown and described will be apparent since it is well known that one of the main difficulties heretofore experienced with this class of machines has been to get the parts sufficiently strong to withstand all the conditions of use without breakage and at the same time keep the weight and cost of the machine within reasonable limits. With my improved form of friction drive it will be apparent that the parts may be made somewhat lighter in proportion without the same liability of breakages, while with the improved form of overhead carrier there is, as already observed, a great saving of power in driving the mechanism because the greater part of the power expended in machines of this class has heretofore been made necessary by the form of feed mechanism employed, which has made it necessary to shift the entire load of manure throughout the length of the wagon box, necessitating an enormous expenditure of power because of friction of the load and the moving parts supporting the same.

In order that the invention may be fully understood, the details of the preferred embodiment thereof have been thus specifically described, but it will be apparent that many changes and modifications in the relations and proportions of the various parts may be made by those skilled in the art without departing from the scope and spirit of the invention.

What I claim is:

1. In a manure spreader, the combination with the running gears and box of a wagon, of a beater shaft, means for driving the beater shaft from the rear wagon wheels comprising friction wheels secured to the beater shaft and adapted to engage the peripheries of the rear wheels of the wagon, and scrapers under the control of the driver for cleaning the tires of the wagon wheels before engagement with the frictional driving wheels of the beater shaft.

2. In a manure spreader, the combination with the running gears and box of a wagon, of a beater shaft journaled to rotate at the rear of the wagon box, friction wheels on the beater shaft adapted to engage the rear wheels of the wagon, means under the control of the driver for operating the beater shaft to cause the friction wheels thereon to engage or disengage the wheels of the wagon, said means comprising a pivoted hand lever, suitable connections between the beater shaft and said pivoted lever, a notched segment adjacent the said lever, a spring controlled latch on said lever adapted to engage said notched segment for controlling the lever, means under control of the driver for rendering said spring pressed latch inoperative and means operative by the foot of the driver to control the beater shaft when the latch is made inoperative.

3. In a manure spreader, the combination with the running gears and box of a wagon, of a beater shaft, friction wheels on the beater shaft adapted to engage the rear wheels of the wagon, means under the control of the driver for causing the said friction wheels on the beater shaft to engage or disengage the wagon wheels comprising a pivoted frame within reach of the driver at the front of the wagon box, suitable connections between said pivoted frame and the beater shaft, a hand lever secured to said pivoted frame and adapted to operate the same, a notched segment adjacent said lever; a spring-pressed latch on said lever adapted to engage the notched segment, and means under the control of the driver for rendering said spring-pressed latch inoperative.

4. In a manure spreader, the combination with a rotatable beater, of feed mechanism comprising an endless belt, a plurality of cleats secured to the endless belt, and metallic teeth secured to the said cleats at a backwardly inclined angle to the plane of the forward movement of the feed belt whereby the said teeth may more readily draw away from the manure on presenting the same to the beater.

5. In a manure spreader, the combination with a beater shaft and a beater carried thereby, of an endless feed belt, and a plurality of cleats carried by the endless feed belt, the said cleats being approximately rectangular in cross-section but having their forward edges beveled to present the feed teeth which may be secured thereto at a backwardly inclined angle to the forward advance of the endless feed belt whereby the feed teeth may be readily discharged from the manure on presenting the same to the beater.

6. In a manure spreader, the combination with a beater shaft operable from the rear wheels of a wagon, a plurality of supports pivotally mounted on the axis of the beater shaft and having journaled in their upper extremities a second shaft parallel with the beater shaft, means for imparting rotation from the beater shaft to the last said shaft, a feed frame pivotally supported on the axis of the last said shaft and being provided with an endless feed belt driven by the shaft, a beater carried by said beater shaft comprising a head provided with a plurality of longitudinal strips carrying teeth for engaging and distributing the manure, a member journaled some distance in front of the beater and being provided with a plurality of fingers extending rearwardly and upwardly over the top of the beater between the teeth on the upper side thereof and between the beater and the said endless feed belt.

7. In a manure spreader, the combination with the running gears and box of a wagon, of a rotatable beater shaft journaled at the rear of the wagon box, a beater on said shaft, friction wheels at the extremities of the said shaft adjacent each of the rear wheels of the wagon and adapted to engage the said wheels to be rotated thereby, means under the control of the driver for shifting the said beater shaft to cause the friction wheels carried thereon to engage or disengage the wheels of the wagon, scrapers for the rear wheels of the wagon pivoted adjacent thereto, and connections between the beater operating means and the pivoted scrapers for operating the scrapers.

8. In a manure spreader, the combination with the running gear and box of a wagon, a beater shaft secured to the wagon box and a beater carried thereby, means for operating the beater shaft, a feed shaft adjacent the beater shaft, means for supporting the said feed shaft, means for operating the feed shaft from the beater shaft, a feed frame pivoted on the feed shaft and extending forwardly over the top of the wagon box, means adjacent the front end of the wagon box for adjustably securing the forward end of the feed frame, the said means comprising a pair of spaced upwardly and rearwardly inclined members carrying a windlass at their upper extremities and having suitable connections therefrom to the feed frame, and feed mechanism carried by the feed frame and operable from the feed shaft.

9. In a manure spreader, in combination, a box or receptacle open at the rear end thereof, a beater adjacent the said open rear end of the box or receptacle and being provided with a supporting shaft, means for rotating the beater shaft, feed mechanism comprising an endless carrier and a frame therefor, means for supporting the said feed mechanism adjacent the beater comprising a plurality of supports each pivoted at one end thereof on the axis of the beater shaft and pivotally connected with the carrier frame at their other extremities, a carrier driving shaft journaled in the axis of the pivoted connection between the supports and the carrier frame and means for imparting movement to the carrier driving shaft, from the beater shaft.

10. In a manure spreader, in combination, a box or receptacle open at the rear end thereof, a beater adjacent the said open rear end of the box or receptacle and being provided with a supporting shaft, means for rotating the beater shaft, feed mechanism comprising an endless carrier and a supporting frame therefor, means for supporting the said feed mechanism adjacent the beater comprising a plurality of supports each pivoted at one end thereof on the axis of the beater shaft and pivotally connected with the carrier frame at their other extremities, a carrier driving shaft journaled in the axis of the pivotal connection between the supports and the carrier frame, means for imparting movement to the carrier driving shaft from the beater shaft, and means for adjustably supporting the forward end of the carrier frame and the feed mechanism, said last mentioned means comprising suitable supports secured to the said box or receptacle of the spreader, a windless carried thereby and having flexible connection with the said frame of the feed mechanism.

In testimony whereof I have signed my name to this specification, in the presence of two subscribing witnesses, on this 23rd day of March A. D. 1910.

PAUL HANSON.

Witnesses:
A. L. KRENIK,
CHARLES S. STRONG.

Copies of this patent may be obtained for five cents each, by addressing the "Commissioner of Patents. Washington, D. C."